(12) United States Patent
Koyama

(10) Patent No.: US 7,957,682 B2
(45) Date of Patent: Jun. 7, 2011

(54) IMAGE FORMING UNIT AND IMAGE FORMING APPARATUS

(75) Inventor: Tetsu Koyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 166 days.

(21) Appl. No.: 12/216,404

(22) Filed: Jul. 3, 2008

(65) Prior Publication Data

US 2009/0010689 A1 Jan. 8, 2009

(30) Foreign Application Priority Data

Jul. 6, 2007 (JP) ................................. 2007-178147

(51) Int. Cl.
*G03G 15/08* (2006.01)

(52) U.S. Cl. ........................................ 399/279; 399/167

(58) Field of Classification Search .................. 399/167, 399/279; 16/2.1, 2.2, 2.3, 2.4, 2.5
See application file for complete search history.

(56) References Cited

U.S. PATENT DOCUMENTS 4,685,172 A * 8/1987 O'Connor ........................ 16/2.1

FOREIGN PATENT DOCUMENTS

| JP | 2000-202996 | 7/2000 |
| JP | 2003-323017 | 11/2003 |
| JP | 2006-048018 | 2/2006 |

* cited by examiner

*Primary Examiner* — David M Gray
*Assistant Examiner* — Barnabas T Fekete
(74) *Attorney, Agent, or Firm* — Rabin & Berdo, PC

(57) ABSTRACT

An image forming unit includes an image bearing body, a rotating body disposed in contact with or disposed facing the image bearing body, a supporting member that supports a rotation shaft of the rotating body, an insertion hole provided on the supporting member, a bearing inserted into the insertion hole and supporting the rotation shaft of the rotating body, and three or more contact portions provided on the bearing or the insertion hole. The contact portions contact the insertion hole or the bearing.

19 Claims, 10 Drawing Sheets

IMAGE FORMING UNIT AND IMAGE FORMING APPARATUS

BACKGROUND OF THE INVENTION

This invention relates to an image forming apparatus such as a copier, a page printer, a facsimile machine, an MFP (i.e., Multifunction Peripheral) or the like, and relates to an image forming unit used in the image forming apparatus to form an image by developing a latent image with developer (for example, toner).

The image forming apparatus using electrophotography includes an image forming unit. The image forming unit includes a photosensitive drum as an image bearing body, a charging roller that uniformly charges the surface of the photosensitive drum, an exposing unit that exposes the surface of the photosensitive drum to form a latent image thereon, a developing roller (i.e., a developer bearing body) that develops the latent image on the photosensitive drum with toner, and a cleaning device that removes the residual toner from the surface of the photosensitive drum. The image forming unit can be configured as a part of a main body of the image forming apparatus, or can be configured as a process cartridge which is detachable from the main body of the image forming apparatus.

Generally, in the image forming unit, the developing roller is disposed in contact with the photosensitive drum or disposed facing the photosensitive drum with a small gap, so as to cause the toner to adhere to the latent image on the photosensitive drum. The developing roller is driven by a driving mechanism to rotate.

In order to adjust a gap between the developing roller and the photosensitive drum or a contact pressure between the developing roller and the photosensitive drum, it is necessary to adjust a center-to-center distance between the developing roller and the photosensitive drum. Therefore, a recently proposed image forming apparatus uses eccentric cams supporting a shaft of the developing roller via bearings. The eccentric cams are rotatably inserted into insertion holes formed on side plates of a chassis of the image forming unit. By rotationally adjusting the eccentric cams in the insertion holes, the position of the shaft of the developing roller changes, and therefore the center-to-center distance between the developing roller and the photosensitive drum changes. Such an image forming apparatus is disclosed by, for example, Japanese Laid-open Patent Publication No. 2006-48018 (see, paragraphs 0068 to 0069 and FIG. 12).

However, in the above described image forming apparatus, gaps may be formed between the eccentric cams and the insertion holes. In such a case, after the center-to-center distance between the developing roller and the photosensitive drum is adjusted, the center-to-center distance between the developing roller and the photosensitive drum may change due to the above described gap when the developing roller and the photosensitive drum rotate. Therefore, there is a possibility that a part of the latent image (on the photosensitive drum) may not be developed, with the result that white spots may appear in a printed image.

In order not to form a gap between the eccentric cam and the insertion hole, it is considered to make the outer diameter of the eccentric cam larger than the inner diameter of the insertion hole. However, in this case, the eccentric cam must be press-fit into the insertion hole, and therefore the rotational adjustment may become difficult because of high rotational friction.

In order to solve these problems, it is necessary to maintain strict dimension tolerances of the eccentric cam and the insertion hole, and therefore difficulties in manufacturing and controlling of the components may increase.

SUMMARY OF THE INVENTION

The present invention is intended to solve the above described problems, and an object of the present invention is to provide an image forming unit and an image forming apparatus capable of facilitating adjusting a center-to-center distance between an image bearing body and a developer bearing body, and capable of preventing a deterioration of printing quality.

The present invention provides an image forming unit including an image bearing body, a rotating body disposed in contact with or disposed facing the image bearing body, a supporting member that supports a rotation shaft of the rotating body, an insertion hole provided on the supporting member, a bearing inserted into the insertion hole and supporting the rotation shaft of the rotating body, and three or more contact portions provided on the bearing or the insertion hole. The contact portions contact the insertion hole or the bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

First Embodiment

Figure 1:
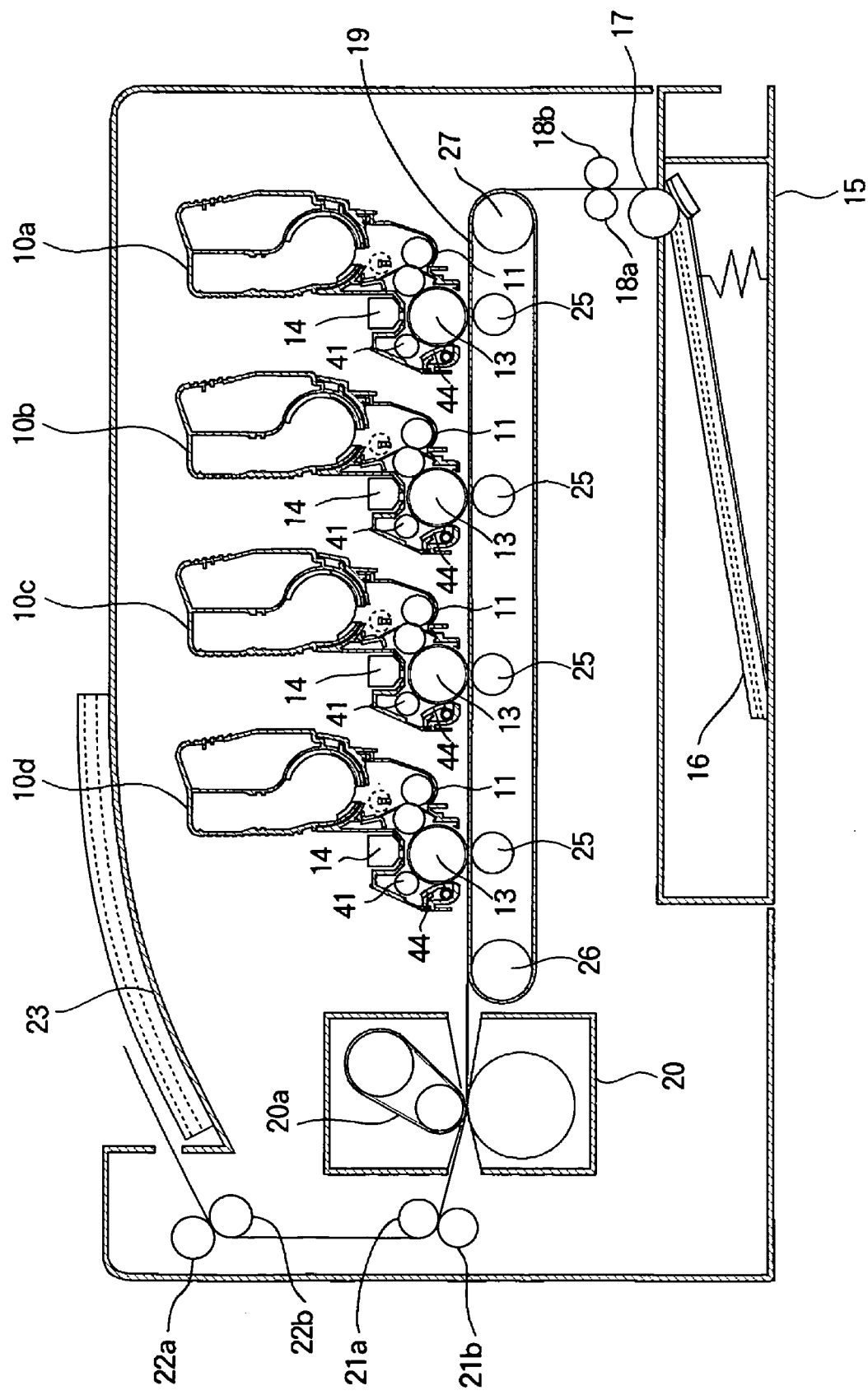
FIG. 1 is a view showing a configuration of an image forming apparatus according to the first embodiment of the present invention.

FIG. 1 shows a configuration of an image forming apparatus to which an image forming unit according to respective embodiments of the present invention is applied. Hereinafter, an image forming apparatus (for example, a color printer) capable of printing a color image will be described as an example of the image forming apparatus.

As shown in FIG. 1, the image forming apparatus includes image forming units 10a, 10b, 10c and 10d that respectively form toner images of black (K), cyan (C), Magenta (M) and yellow (Y). The respective image forming units 10a, 10b, 10c and 10d are arranged at constant intervals along a path (in this example, a horizontal path) along which a medium 16 is conveyed as described later.

A medium tray 15 for storing media (for example, recording sheets) 16 is mounted in a lower part of the image forming apparatus. A feeding roller 17 is disposed so as to contact an end portion (i.e., a right end in FIG. 1) of the uppermost medium 16 stored in the medium tray 15. The feeding roller 17 rotates to individually feed the medium 16. A pair of conveying rollers 18a and 18b for conveying the medium 16 are disposed on the sheet feeding side (i.e., upside in FIG. 1) of the feeding roller 17.

Further, a transfer belt 19 is provided for conveying the medium 16 (having been conveyed by the conveying rollers 18a and 18b) through the respective image forming units 10a, 10b, 10c and 10d so that toner images of the respective colors are transferred to the surface of the medium 16.

Figure 2:
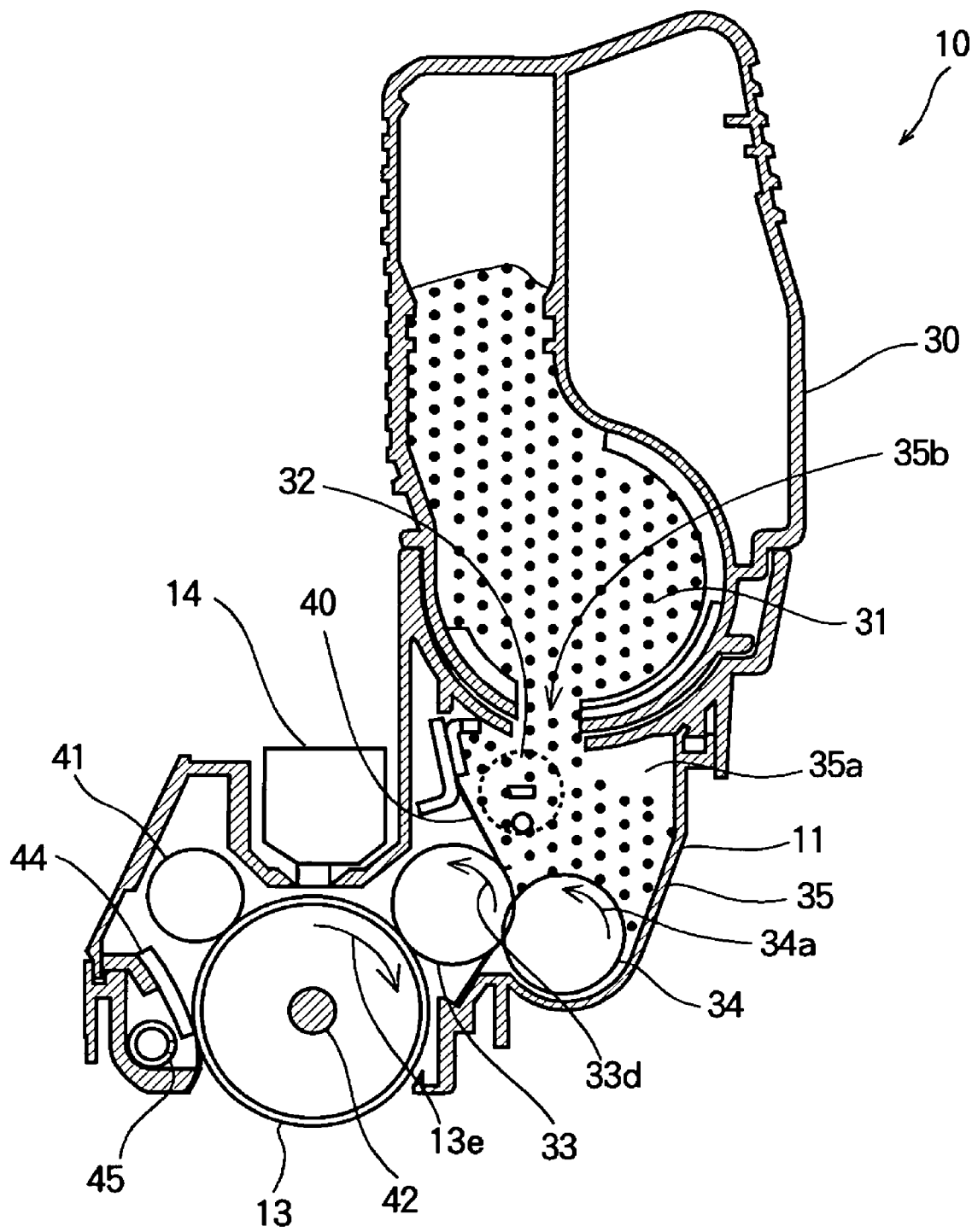
FIG. 2 is a sectional view showing an image forming unit according to the first embodiment.

FIG. 2 is a sectional view showing a common internal configuration of the respective image forming units 10a, 10b, 10c and 10d. The image forming units 10a, 10b, 10c and 10d have the same configurations, and therefore the image forming units 10a, 10b, 10c and 10d are commonly referred to herein as an image forming unit 10.

The image forming unit 10 includes a photosensitive drum 13 as an image bearing body, a charging roller 41 that uniformly charges the surface of the photosensitive drum 13, an exposing unit 14 (for example, an LED head) that exposes the surface of the photosensitive drum 13 to form a latent image thereon, a developing unit 11 that develops the latent image on the photosensitive drum 13 with toner (i.e., developer), a cleaning blade 44 that scrapes off the residual toner from the surface of the photosensitive drum 13, and a waste toner spiral 45 that ejects the waste toner (scraped off by the cleaning blade 44) to the outside. Further, a toner container 30 for storing the toner 31 of a predetermined color is provided on the upper side of the developing unit 11.

The image forming unit 10 has a chassis 35 which is a casing of the developing unit 11. A supplying opening 35b is provided on the upper part of the chassis 35 for receiving the toner supplied by the toner container 30. The developing unit 11 includes a toner hopper 35a that stores the toner 31 supplied via the supply opening 35b, an agitating member 32 that agitates the toner 31 in the toner hopper 35a, a developing roller 33 (which is a rotating body) as a developer bearing body disposed in contact with the photosensitive drum 13 (or disposed facing the photosensitive drum 13 with a certain gap), a toner supply roller 34 that supplies the toner 31 to the developing roller 33, and a developing blade 40 that regulates the thickness of the toner layer formed on the surface of the developing roller 33.

As shown in FIG. 1, four transfer rollers 25 are disposed facing the respective photosensitive drums 13 of the image forming units 10a, 10b, 10c and 10d. The transfer rollers 25 are disposed so that the above described transfer belt 19 is sandwiched between the respective transfer rollers 25 and the photosensitive drums 13. A driving roller 26 and a driven roller 27 are disposed on both ends of the transfer rollers 25 in the arranging direction of the transfer rollers 25. The transfer belt 19 is wound around the driving roller 26 and the driven roller 27. The transfer belt 19 is moved by the rotation of the driving roller 26. The transfer rollers 25 are applied with bias voltages causing the toner images on the respective photosensitive drums 13 to be transferred to the medium 16 held on the transfer belt 19.

The fixing unit 20 is disposed on the downstream side (i.e., left side in FIG. 1) of the image forming units 10a, 10b, 10c and 10d in the conveying direction of the medium 16. The fixing unit 20 applies heat and pressure to the toner image having been transferred to the medium 16 to thereby fix the toner image to the medium 16. Although the fixing unit 20 shown in FIG. 1 uses a fixing belt 20a, the fixing unit 20 can be configured to have a pressure roller and a heating roller that hold the medium 16 therebetween.

Two pairs of eject rollers 21a, 21b, 22a and 22b are disposed on the downstream side of the fixing unit 20 in the conveying direction of the medium 16. The eject rollers 21a, 21b, 22a and 22b convey the medium 16 (to which the toner image is fixed) to thereby eject the medium 16 to a stacker portion 23 provided on the outside (in this example, on an upper cover) of the image forming apparatus.

Next, the configuration of each image forming unit 10 will be further described.

Figure 3:
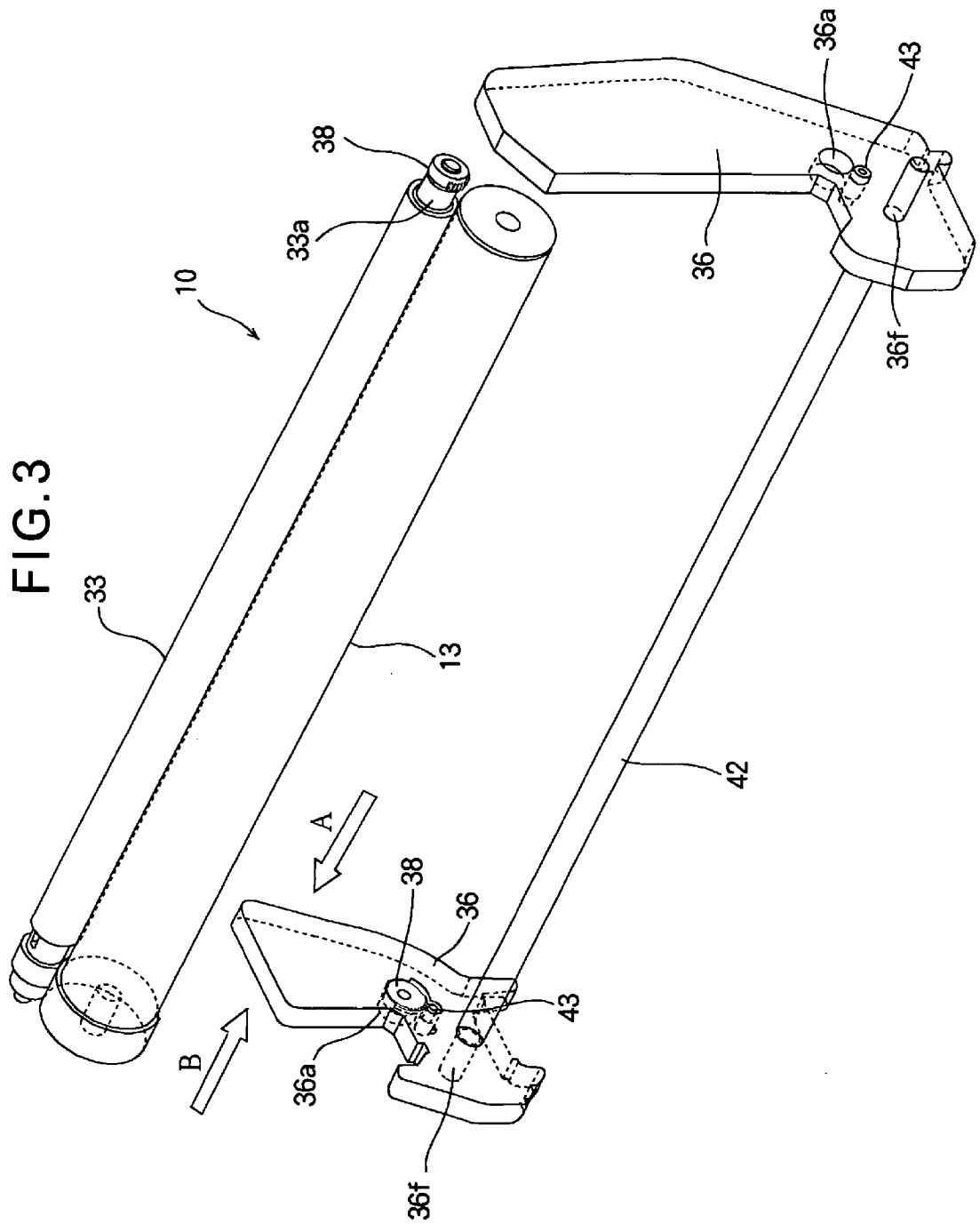
FIG. 3 is an exploded perspective view showing a developing roller and a supporting structure thereof in the image forming unit according to the first embodiment.

FIG. 3 is an exploded perspective view showing the developing roller 33 and its supporting structure provided in the image forming unit 10. A pair of side plates 36 (i.e., supporting members) are provide on both ends of the chassis 35 (FIG. 2) in the longitudinal direction of the chassis 35, i.e., in the axial direction of the developing roller 33. The side plates 36 are plate-like members, and also referred to as end chassis. The side plates 36 are fixed to the chassis 35 via screws or the like.

A rotation shaft (i.e., a rotation support shaft) 42 of the photosensitive drum 13 is not rotatable itself, and both ends of the rotation shaft 42 fit into (and fixed to) through-holes 36f formed on the side plates 36.

Eccentric bearings 38 are provided on both ends of a rotation shaft 33a of the developing roller 33. The eccentric bearings 38 rotatably support the rotation shaft 33a of the developing roller 33, and are inserted into insertion holes 36a formed on the side plates 36. Fixing pins 43 are provided on the side plates 36, for fixing the rotational positions of the eccentric bearings 38.

Figure 4:
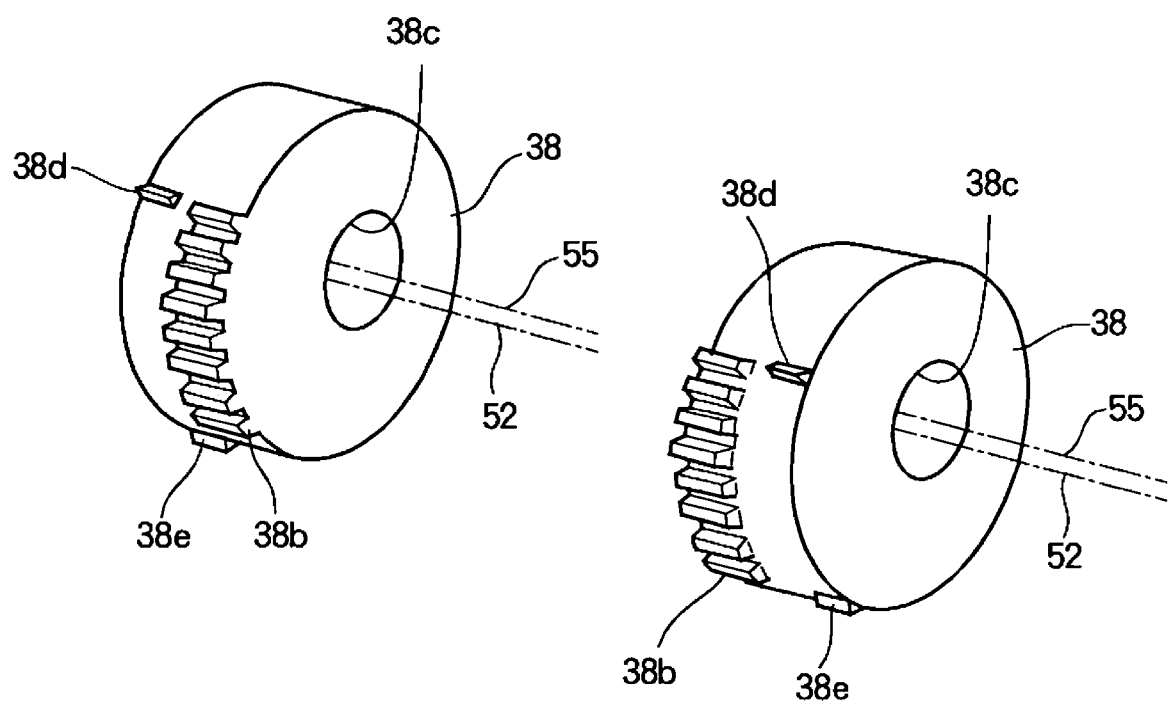
FIG. 4 is a perspective view showing schematic shapes of eccentric bearings according to the first embodiment.

FIG. 4 is a perspective view showing schematic shapes of the eccentric bearings 38. As shown in FIG. 4, the eccentric bearings 38 have symmetric shapes, to be more specific, shapes which are symmetric with respect to a center in the axial direction of the developing roller 33 shown in FIG. 3.

Each eccentric bearing 38 has an outer circumferential surface of a substantially cylindrical shape. An adjustment gear 38b which is a sector gear is formed on the outer circumferential surface of the eccentric bearing 38. The adjustment gear 38b is disposed on an end portion (i.e., an inner end portion) of the eccentric bearing 38 in the axial direction of the eccentric bearing 38. Two or more (in this example, two) protrusions 38d and 38e are formed on the other end portion (i.e., an outer end portion) of the outer circumferential surface of the eccentric bearing 38. The protrusions 38d and 38e are disposed on two positions distanced from each other in the circumferential direction of the eccentric bearing 38, for example, two positions defining a center angle of approximately 120 degrees with respect to the center axis of the eccentric bearing 38. Each of the protrusions 38d and 38e preferably has a certain length in the axial direction of the eccentric bearing 38, and preferably has a sectional shape (for example, a triangular shape) having a width decreasing toward a tip.

The eccentric bearings 38 are preferably formed of plastic, to be more specific, poly-acetal. The eccentric bearings 38 are preferably made of material having Young's modulus in a range from 2000 to 4000 MPa and allowable bending stress in a range from 50 to 200 MPa.

Figure 5:
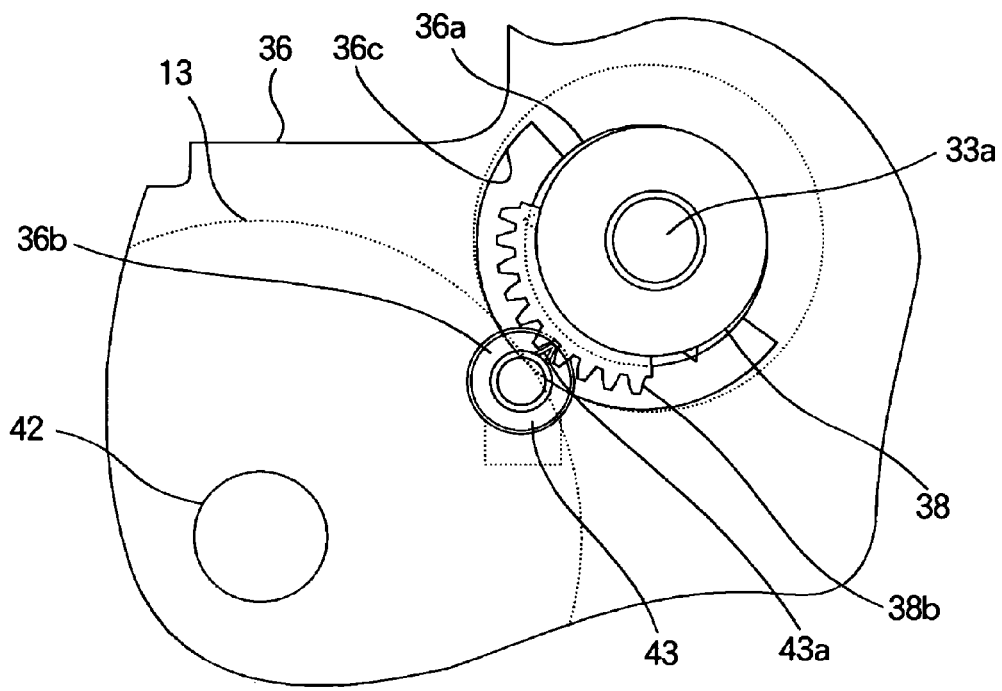
FIG. 5 is a side view showing the eccentric bearing and an insertion hole according to the first embodiment.
Figure 6:
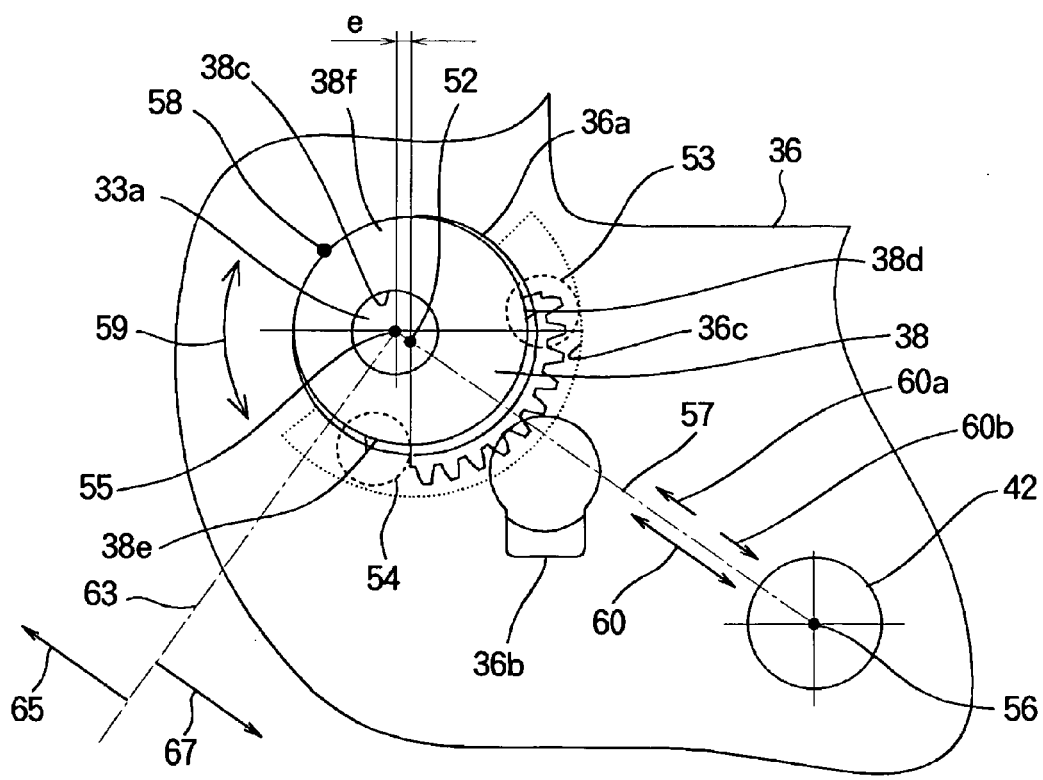
FIG. 6 is another side view showing the eccentric bearing and the insertion hole according to the first embodiment.

FIG. 5 shows a portion of the side plate 36 on which the eccentric bearing 38 is mounted, as seen in the direction indicated by an arrow A in FIG. 3. FIG. 6 shows the portion of the side plate 36 on which the eccentric bearing 38 is mounted, as seen in the direction indicated by an arrow B in FIG. 3.

The side plate 36 is made of plastic which is harder than (i.e., which has Young's modulus greater than) the material of the eccentric bearing 38. The side plate 36 has a circular insertion hole 36a into which the eccentric bearing 38 is inserted. A cutaway portion 36c having an arcuate shape is formed along a periphery of the insertion hole 36a. The cutaway portion 36c provides a space for the adjustment gear 38b of the eccentric bearing 38. The adjustment gear 38b of the eccentric bearing 38 engages a protrusion 43a of the fixing pin 43 disposed in a fixing hole 36b formed on the side plate 36.

As shown in FIG. 6, the eccentric bearing 38 has a circular supporting hole 38c that supports the rotation shaft 33a of the developing roller 33. A shifting amount "e" exists between a center axis 52 of the outer circumferential surface (i.e., cylindrical surface) of the eccentric bearing 38 and a center axis 55 of the supporting hole 38c. Therefore, when the eccentric bearing 38 rotates in the insertion hole 36a, the position of the rotation shaft 33a of the developing roller 33 changes, and therefore the center-to-center distance between the developing roller 33 and the photosensitive drum 13 changes.

The protrusions 38d and 38e formed on the outer circumferential surface of the eccentric bearing 38 have shapes having widths decreasing toward the tips, in a state where the eccentric bearing 38 is not yet inserted into the insertion hole 36a. However, the tips of the protrusions 38d and 38e are deformed in a state where the eccentric bearing 38 is inserted (i.e., press-fit) into the insertion hole 36a.

Figure 7A:
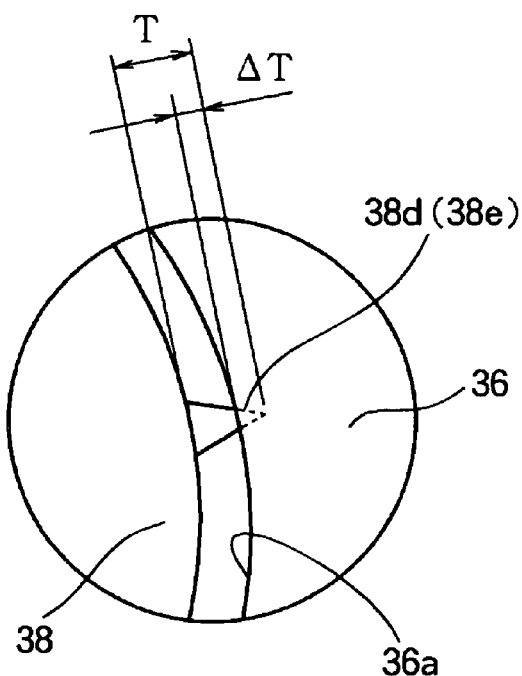
FIGS. 7A and 7B are schematic views for illustrating a deformation of protrusions of the eccentric bearing according to the first embodiment.
Figure 7B:
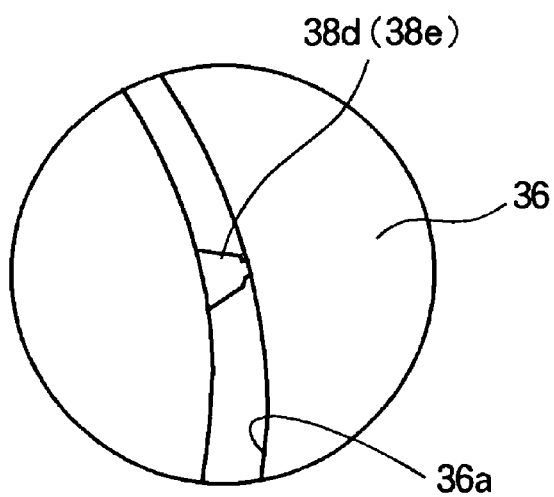

FIG. 7A schematically shows the shapes of the protrusions 38d and 38e of the eccentric bearing 38 before the protrusions 38d and 38e are deformed. FIG. 7B schematically shows the shapes of the protrusions 38d and 38e of the eccentric bearing 38 after the protrusions 38d and 38e are deformed by the insertion of the eccentric bearing 38 into the insertion hole 36a. In FIG. 7A, the protruding amount of each of the protrusions 38d and 38e with respect to the outer circumferential surface of the eccentric bearing 38 is expressed as "T" which is a positive value. The interfering amount of each of the protrusions 38d and 38e with the insertion hole 36a on the assumption that the protrusions 38d and 38e are not deformed is expressed as "Δ" which is a positive value.

An outer diameter of the eccentric bearing 38 is expressed as "Dh", and an inner diameter of the insertion hole 36a is expressed as "Ds". Dimensions of the eccentric bearing 38, the protrusions 38d and 38e and the insertion hole 36a are determined so as to satisfy the following relationships:

$$Dh < Ds \quad (1)$$

$$Dh + T > Ds \quad (2)$$

$$(Dh + T) - Ds = \Delta T \quad (3)$$

As shown in FIG. 7B, the eccentric bearing 38 is press-fit into the insertion hole 36a in a state where the tips of the protrusions 38d and 38e contact the inner circumferential surface of the insertion hole 36a and are deformed by the amount ΔT. The amount ΔT of deformation is preferably in a range from 100 μm to 500 μm.

Further, as shown in FIG. 6, the eccentric bearing 38 abuts against the inner circumferential surface of the insertion hole 36a at an abutting portion 58 (i.e., a linear portion in the axial direction of the eccentric bearing 38) equally distanced from the protrusions 38d and 38e in the circumferential direction of the eccentric bearing 38. That is, the eccentric bearing 38 abuts against the inner circumferential surface of the insertion hole 36a at three positions in the circumferential direction of the eccentric bearing 38. The protrusions 38d and 38e and the abutting portion 58 of the eccentric bearing 38 almost linearly contact the inner circumferential surface of the insertion hole 36a with a certain length in the axial direction of the eccentric bearing 38.

In this regard, the abutting portion 58 is a part of a main body 38f of the eccentric bearing 38. Further, the abutting portion 58 and the protrusions 38d and 38e constitute contact portions that contact the inner circumferential surface of the insertion hole 36a. Although three contact portions (i.e., the abutting portion 58 and the protrusions 38d and 38e) contact the inner circumferential surface of the insertion hole 36a in this embodiment, the number of the contact portions can be four or more.

Next, the operation of the above configured image forming apparatus will be described with reference to FIGS. 1 and 2.

Upon receiving a printing command sent from a not shown external apparatus (for example, a computer), the image forming apparatus causes the feeding roller 17 to individually feed the medium 16 from the medium tray 15, and cause the conveying rollers 18a and 18b to convey the medium 16 to the transfer belt 19. The transfer belt 19 holds and conveys the medium 16 so that the medium 16 passes through the image forming units 10a, 10b, 10c and 10d (i.e., the image forming units 10).

In each image forming unit 10, as shown in FIG. 2, the toner supply roller 34 is driven by a not shown driving source to rotate in the direction shown by an arrow 34a, and supplies the toner to the surface of the developing roller 33. The developing roller 33 is driven by a not shown driving source to rotate in the direction shown by an arrow 33d so that the toner adheres to the surface of the developing roller 33. The thickness of the toner layer on the developing roller 33 is regulated by the developing blade 40, so that a thin toner layer having a uniform thickness is formed on the developing roller 33. The toner layer on the developing roller 33 is electrically charged due to friction electrification.

The photosensitive drum 13 is driven by a not shown driving source to rotate in the direction shown by an arrow 13e. The surface of the photosensitive drum 13 is uniformly charged by the charging roller 41, and exposed by the exposing unit 14 according to image information. The electric potential of exposed parts decreases to 0V, and the electric potential of unexposed parts are maintained, so that a latent image is formed on the surface of the photosensitive drum 13. Thereafter, the toner on the surface of the developing roller 33 adheres to the latent image on the surface of the photosensitive drum 13, and the toner image (i.e., a developer image) is formed.

The toner image formed on the surface of the photosensitive drum 13 is transferred to the medium 16 by means of the transfer roller 25 and the transfer belt 19 shown in FIG. 1. The residual toner remaining on the surface of the photosensitive drum 13 is scraped off by the cleaning blade 44, and is ejected by the waste toner spiral 45 (FIG. 2) to the outside of the image forming unit 10.

The medium 16 to which the toner image has been transferred is conveyed to the fixing unit 20 shown in FIG. 1. The fixing unit 20 applies heat and pressure to the toner image to thereby fix the toner image to the surface of the medium 16. The medium 16 to which the toner image has been fixed is ejected by the eject rollers 21a, 21b, 22a and 22b to the outside of the main body of the image forming apparatus, and is placed (stacked) on the stacker portion 23.

Next, the adjustment of the center-to-center distance between the developing roller 33 and the photosensitive drum 13 (performed in the manufacturing process of the image forming apparatus) will be described.

After the developing roller 33 and the photosensitive drum 13 are assembled into the image forming unit 10, the adjustment of the center-to-center distance between the developing roller 33 and the photosensitive drum 13 is performed so as to obtain an appropriate contact pressure (or appropriate gap) between the developing roller 33 and the photosensitive drum 13.

Figure 8:
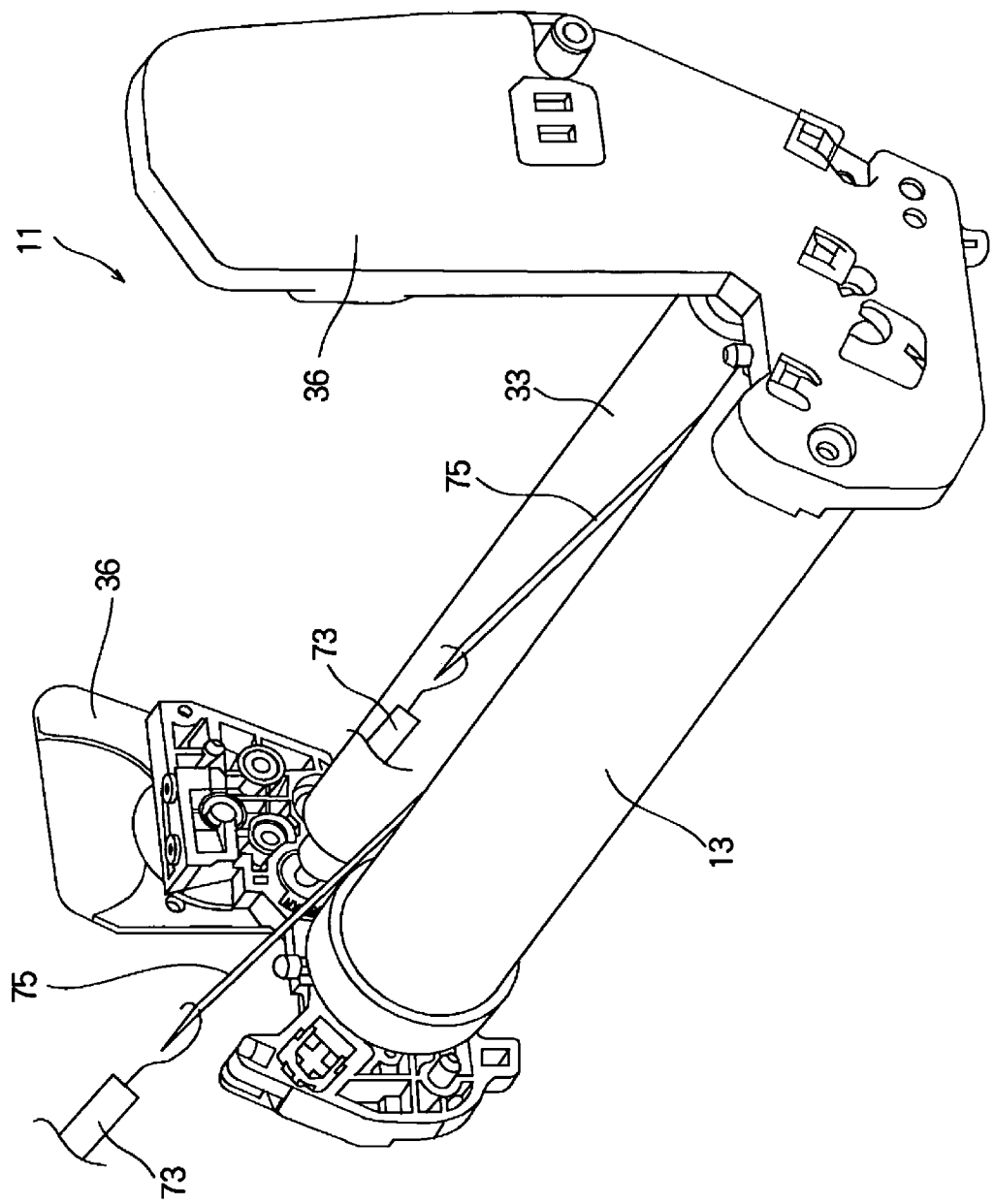
FIG. 8 is a perspective view for illustrating an adjustment of a center-to-center distance according to the first embodiment.

As shown in FIG. 8, thin films 75 are inserted into a contact portion between the developing roller 33 and the photosensitive drum 13. In this example, two thin films 75 are inserted into the contact portions respectively in the vicinities of the ends of the developing roller 33 in the axial direction. A pulling force when the thin film 75 is pulled out of each contact portion between the developing roller 33 and the photosensitive drum 13 is measured using a tension gauge 73.

In this regard, the center axis 55 of the rotation shaft 33a of the developing roller 33 is shifted from the center axis 52 of the eccentric bearing 38 by the above described shifting amount "e" as shown in FIG. 6. Therefore, when the eccentric bearing 38 is rotated in the circumferential direction of the insertion hole 36a (i.e., an arrow 59 in FIG. 6), the center-to-center distance 57 between the center axis 56 of the rotation shaft 42 of the photosensitive drum 13 and the center axis 55 of the rotation shaft 33a of the developing roller 33 changes as shown by an arrow 60. The change in the center-to-center distance 57 appears as a change in the pulling force of the thin film 75.

Therefore, in this adjustment, the eccentric bearing 38 is gradually rotated while measuring the pulling force of the thin film 75 using the tension gauge 73, and the eccentric bearing 38 is fixed at a rotational position where the pulling force of the thin film 75 is a predetermined value. In order to fix the eccentric bearing 38, the fixing pin 43 (FIG. 5) is inserted into the fixing hole 36b (FIG. 6), and the protrusion 43a of the fixing pin 43 is brought into engagement with the adjusting gear 38b of the eccentric bearing 38.

Further, the adjustment of the other eccentric bearing 38 is performed in a similar manner, and the eccentric bearing 38 is fixed at a rotational position where the pulling force of the thin film 75 is a predetermined value.

In this way, the rotational positions of a pair of eccentric bearings 38 are determined respectively in the insertion holes 36a, and the adjustment of the center-to-center distance between the developing roller 33 and the photosensitive drum 13 is completed. After the adjustment of the center-to-center distance is completed, the image forming unit 10 is mounted in the image forming apparatus.

Next, an advantage of the embodiment will be described.

In FIG. 6, when the center-to-center distance 57 between the developing roller 33 and the photosensitive drum 13 is expressed as S1, the radius of the developing roller 33 is expressed as Rg, and the radius of the photosensitive drum 13 is expressed as Rd, it is necessary to satisfy the following relationship for causing the developing roller 33 and the photosensitive drum 13 to contact each other:

$$S1 < Rg + Rd \quad (4)$$

The developing roller 33 is pressed into the photosensitive drum 13 by a small amount (referred to as a pressing amount) which is several tens of micrometers, and the pressing amount is expressed as Rg+Rd−S1. For the purpose of preventing the fluctuation of the pressing amount, it is ideal that the outer diameter Dh of the eccentric bearing 38 and the inner diameter Ds of the insertion hole 36a satisfy:

$$Dh = Ds \quad (5)$$

However, in a practical manufacturing process, it is difficult to correctly satisfy the relationship (5). Meanwhile, if the outer diameter Dh of the eccentric bearing 38 is smaller than the inner diameter Ds of the insertion hole 36a (Dh<Ds), a gap is formed between the eccentric bearing 38 and the insertion hole 36a. In such a case, the contact pressure may decrease even when the gap is as small as approximately ½ of the pressing amount, and therefore a printing failure (such as white spots) may occur at end portion of the medium 16. Therefore, in order to prevent the fluctuation of the pressing amount (Rg+Rd−S1), it is necessary to satisfy Dh>Ds, and therefore it is necessary to press-fit the eccentric bearing 38 into the insertion hole 36a. However, if the eccentric bearing 38 is press-fit into the insertion hole 36a, the rotational load (i.e., a resistance) of the eccentric bearing 38 increases depending on the press-fitting amount.

For these reasons, in this embodiment, the protrusions 38d and 38e are provided on the outer circumferential surface of the eccentric bearing 38. With the protrusions 38d and 38e, it becomes possible to prevent the fluctuation of the pressing amount while restricting the increase of the rotational load when the eccentric bearing 38 is rotationally adjusted in the insertion hole 36a.

Figure 9:
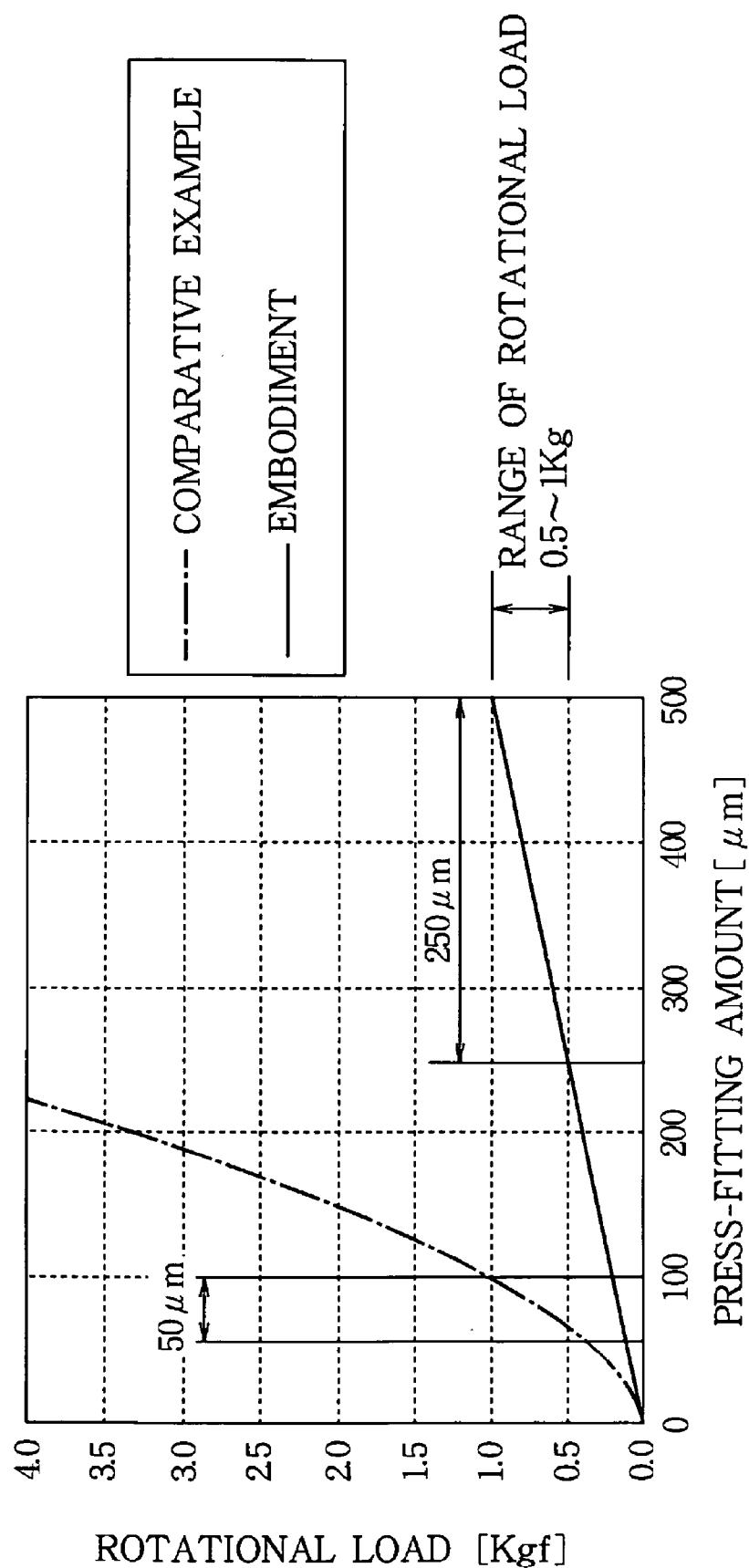
FIG. 9 is a graph showing a relationship between a press-fitting amount of the eccentric bearing into the insertion hole and a rotational load.

FIG. 9 is a graph showing a relationship between a press-fitting amount of the eccentric bearing 38 into the insertion hole 36a and a rotational load. In FIG. 9, a dashed line indicates a rotational load of a comparative example where the eccentric bearing 38 has no protrusions 38d and 38e and is press-fit into the insertion hole 36a entirely around the outer circumferential surface of the eccentric bearing 38. Further, in FIG. 9, a solid line indicates a rotational load of the present embodiment where the eccentric bearing 38 has protrusions 38d and 38e and is press-fit in the insertion hole 36a. The vertical axis represents a rotational load (kgf) when the eccentric bearing 38 is rotationally adjusted, and the horizontal axis represents a press-fitting amount, i.e., an amount of deformation of the eccentric bearing 38 or the protrusions 38d and 38e.

As shown in FIG. 9, in the case where the eccentric bearing 38 is press-fit into the insertion hole 36a entirely around the outer circumferential surface of the eccentric bearing 38 (comparative example), the press-fitting amount needs to be in a range from 50 to 100 μm, in order to maintain the rotational load in a range from 0.5 to 1.0 kgf. Therefore, it is necessary to control the dimension tolerance of, for example, the outer diameter of the eccentric bearing 38 within approximately 50 μm. In contrast, according to the embodiment, the rotational load can be maintained in the same range when the press-fitting amount is in a range from 250 to 500 μm. Therefore, it is only necessary to control the dimension tolerance within approximately 250 μm.

In this regard, the above described range of the press-fitting amount (i.e., from 250 to 500 μm) corresponds to the assumed range of the rotational load (i.e., from 0.5 to 1.0 kgf). However, the preferable range of the press-fitting amount is actually from 100 to 500 µm as was described above.

In this embodiment, the eccentric bearing 38 contacts the inner circumferential surface of the insertion hole 36a at three positions (the protrusions 38d and 38e and the abutting portion 58), and the position of the eccentric bearing 38 is geometrically determined. Therefore, the contact pressure between the developing roller 33 and the photosensitive drum 13 can be stabilized, i.e., backlash or rotation failure of the eccentric baring 38 can be prevented. As a result, a defective printing can be prevented.

As described above, according to this embodiment, the protrusions 38d and 38e provided on the eccentric bearing 38 contact the inner circumferential surface of the insertion hole 36a, and therefore it becomes possible to restrict the increase of rotational load caused by the press-fitting of the eccentric bearing 38 into the insertion hole 36a. With this, it becomes possible to loosen the dimension tolerances of the eccentric bearing 38 and the insertion hole 36a. As a result, the manufacturing cost of the components can be reduced.

Additionally, the backlash and rotation failure of the eccentric bearing can be prevented, and therefore the contact pressure between the developing roller 33 and the photosensitive drum 13 can be stabilized, and the printing failure can be prevented.

In this regard, the photosensitive drum 13 and the developing roller 33 are pressed against each other during the rotation, and therefore the photosensitive drum 31 tends to move (retract) in the direction shown by an arrow 60b in FIG. 6, and the developing roller 33 tends to move (retract) in the direction shown by an arrow 60a in FIG. 6. In this state, the eccentric bearing 38 is applied with a force in the direction shown by the arrow 60a. Therefore, in this embodiment, the protrusions 38d and 38e are provided on the photosensitive drum 13 side (i.e., an arrow 67 side) with respect to a plane 63 defined to be perpendicular to the center-to-center distance 57 between the photosensitive drum 31 and the developing roller 33. The abutting portion 58 (as a part of the main body 38f) is provided on the other side (which is opposite to the photosensitive drum 13 side, i.e., an arrow 65 side) with respect to the plane 63.

That is, among the contact portions (i.e., the protrusions 38d and 38e and the abutting portion 58) contacting the inner circumferential surface of the insertion hole 36a, the protrusions 38d and 38e (which are more likely to be deformed by the external force) are provided on the arrow 67 side, and the abutting portion 58 (which are not deformed by the external force) is provided on the arrow 65 side. With such a configuration, even when the eccentric bearing 38 is applied with a force in the direction shown by the arrow 60a (due to the rotation of the photosensitive drum 13 and the developing roller 33 pressed against each other), it is possible to restrict the deformation of the protrusions 38d and 38e and the abutting portion 58 contacting the inner circumferential surface of the insertion hole 36a. As a result, the position of the rotation shaft 33a of the developing roller 33 can be constantly maintained by the eccentric bearing 58, and it becomes possible to prevent the contact pressure between the photosensitive drum 13 and the developing roller 33 from changing with time.

Further, in this embodiment, the center-to-center distance is adjusted by inserting the thin film 75 into the contact portion between the developing roller 33 and the photosensitive drum 13, and therefore it becomes possible to adjust the center-to-center distance so as to optimize the contact pressure between the developing roller 33 and the photosensitive drum 13.

Furthermore, since the protrusions 38d and 38e are so shaped to have widths decreasing toward the tips, and therefore the tips of the protrusions 38d and 38e are surely deformed when the eccentric bearing 38 is press-fit into the insertion hole 36a, without causing deformation of the inner circumferential surface of the insertion hole 36a.

Moreover, the insertion hole 36a is formed on a part (i.e., the side plate 36) of the chassis 35 of the image forming unit, and therefore the structure for rotatably supporting the eccentric bearing 38 can be simplified.

Additionally, the adjustment gear 38c of the eccentric bearing 38 engages the fixing pin 43, and therefore it becomes possible to prevent the fluctuation of the center-to-center distance between the developing roller 33 and the photosensitive drum 13 after the adjustment.

Although two protrusions 38d and 38e are provided on each eccentric bearing 38 in this embodiment, it is also possible to provide three or more protrusions on the eccentric bearing 38.

Figure 10:
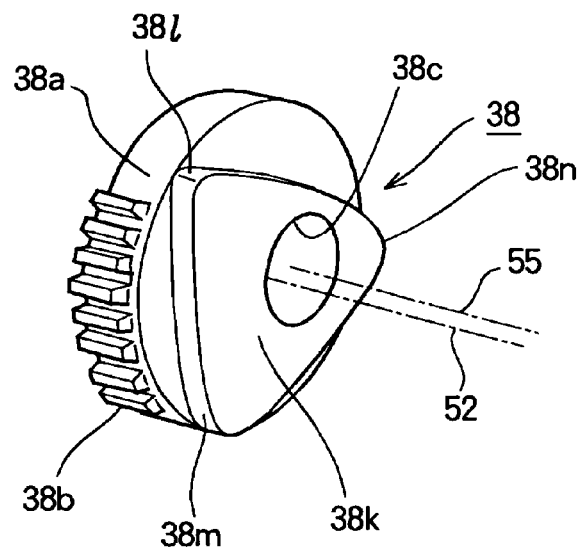
FIG. 10 is a perspective view showing another configuration example of the eccentric bearing.

FIG. 10 shows another configuration example of the eccentric bearing 38. In this configuration example, the eccentric bearing 38 includes a gear portion 38a and an eccentric cam portion 38k provided on a side of the gear portion 38a in the axial direction. The eccentric cam portion 38k has contact portions 38l, 38m and 38n that contact the inner circumferential surface of the insertion hole 36a. In other words, the eccentric bearing 38 shown in FIG. 10 is configured so that the contact portions 38l, 38m and 38n contact the inner circumferential surface of the insertion hole 36a, instead of the protrusions 38d and 38e and the contact portion 58 shown in FIG. 6. The number of contact portions 38l, 38m and 38n is not limited to three, but can be four or more.

In this embodiment, the developing roller 33 is described as an example of a rotating body. However, this embodiment is also applicable to a rotating body disposed in contact with or disposed facing the photosensitive drum 13, such as a charging roller 41, a transfer roller 25, a cleaning roller (which removes the residual toner from the surface of the photosensitive drum 13) or like.

Second Embodiment

In the above described first embodiment, the protrusions 38d and 38e are provided on the outer circumferential surface of the eccentric bearing 38. In this second embodiment, protrusions (contact portions) are provided on the inner circumferential surface of the insertion hole 36a of the side plate 36.

Figure 11:
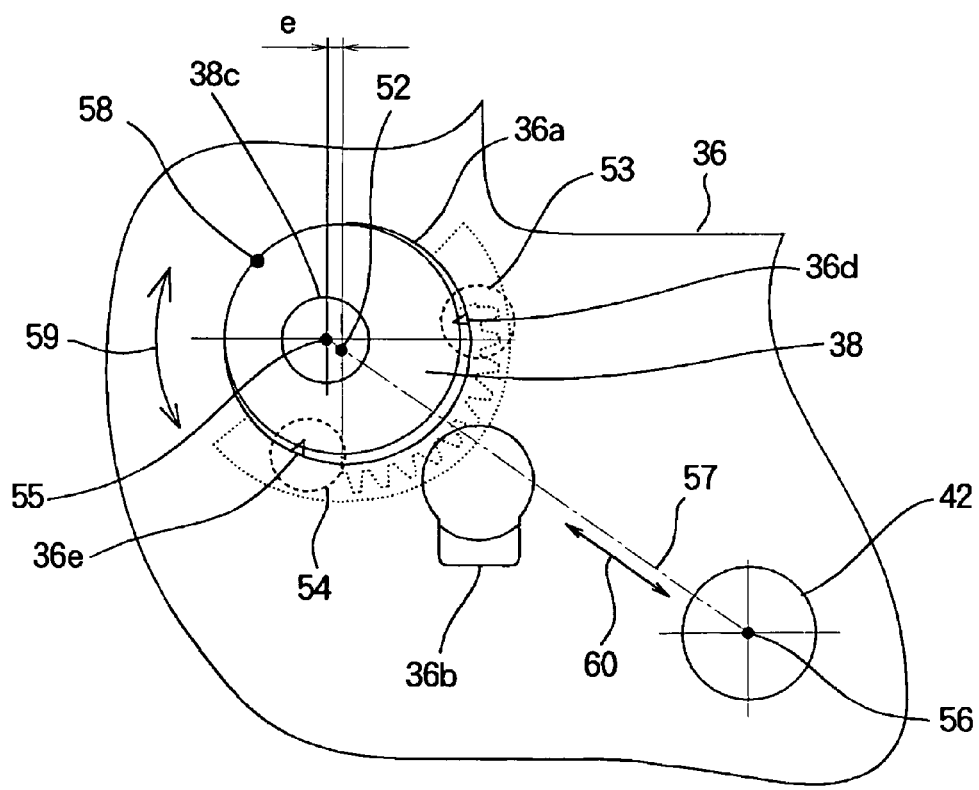
FIG. 11 is a view showing an eccentric bearing and an insertion hole according to the second embodiment.

FIG. 11 is a side view showing a portion of the side plate 36 on which the eccentric bearing 38 is provided, as seen in the direction shown by the arrow B shown in FIG. 3. As shown in FIG. 11, protrusions 36d and 36e are formed on the inner circumferential surface of the insertion hole 36a in which the eccentric bearing 38 is inserted. The eccentric bearing 38 has no protrusions.

As was described in the first embodiment, the eccentric bearing 38 has a support hole 38c for supporting the rotational shaft 33a of the developing roller 33, and there is a shifting amount "e" between the center axis 52 of the eccentric bearing 38 and the center axis 55 of the support hole 38c.

In this second embodiment, the eccentric bearing 38 is made of material which is harder than (i.e., which has Young's modulus greater than) the material of the side plate 36.

Figure 12A:
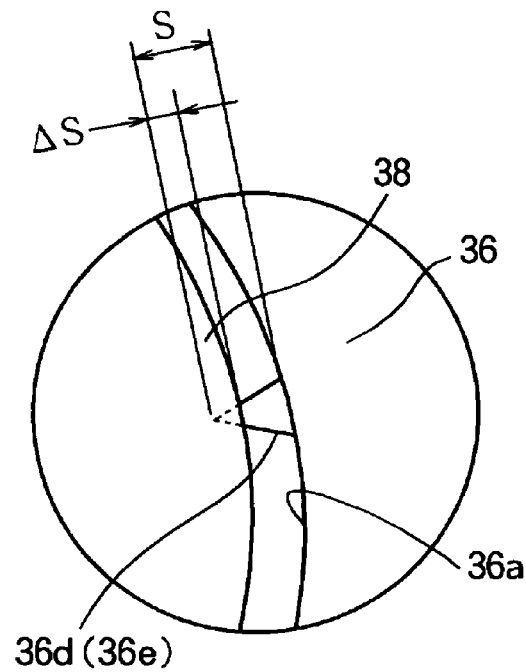
FIGS. 12A and 12B are schematic views for illustrating a deformation of protrusions of the insertion hole according to the second embodiment.
Figure 12B:
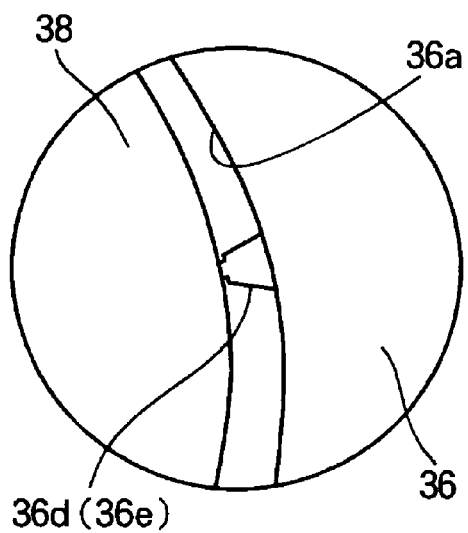

FIG. 12A schematically shows the shapes of the protrusions 36d and 36e of the insertion hole 36a before the protrusions 36d and 36e are deformed, and FIG. 12B schematically shows the shapes of the protrusions 36d and 36e of the insertion hole 36a after the protrusions 36d and 36e are deformed by the insertion of the eccentric bearing 38 into the insertion hole 36a.

In FIG. 12A, the protruding amount of each of the protrusions 36d and 36e with respect to the inner circumferential surface of the insertion hole 36a is expressed as "S" which is a positive value. The interfering amount of each of the protrusions 36d and 36e with the eccentric bearing 38 on the assumption that the protrusions 36d and 36e are not deformed is expressed as "ΔS" which is a positive value.

An outer diameter of the eccentric bearing 38 is expressed as "Dh", and an inner diameter of the insertion hole 36a is expressed as "Ds". Dimensions of the eccentric bearing 38, the insertion hole 36a and the protrusions 36d and 36e are determined so as to satisfy the following relationships:

$$Dh < Ds \quad (6)$$

$$Ds - S > Dh \quad (7)$$

$$Dh - (Ds - S) = \Delta S \quad (8)$$

As shown in FIG. 12B, the eccentric bearing 38 is press-fit into the insertion hole 36a in a state where the tips of the protrusions 36d and 36e contact the outer circumferential surface of the eccentric bearing 38 and are deformed by the amount ΔS. The amount ΔS of deformation is preferably in a range from 100 μm to 500 μm.

As shown in FIG. 11, the eccentric bearing 38 abuts against the inner circumferential surface of the insertion hole 36a at an abutting portion 58 (contact portion) which is almost equally distanced from the protrusions 36d and 36e of the inner circumferential surface of the insertion hole 36a in the circumferential direction. That is, the eccentric bearing 38 abuts against the inner circumferential surface of the insertion hole 36a at three positions in the circumferential direction of the eccentric bearing 38.

Similarly, protrusions which are the same as the protrusions 36d and 36e are provided on the inner circumferential surface of the insertion hole 36a of the other side plate 36. The eccentric bearing 38 is inserted into the insertion hole 36a in a state where the protrusions 36d and 36e abut against the outer circumferential surface of the eccentric bearing 38 and are deformed.

The operation of the image forming apparatus and the adjusting method of the center-to-center distance in this second embodiment are the same as those of the first embodiment except that the protrusions 36d and 36e are deformed when the eccentric bearing 38 is inserted into the insertion hole 36a.

The second embodiment provides the following advantages in addition to the advantages described in the first embodiment.

In the above described first embodiment, the protrusions 38d and 38e are provided on the eccentric bearing 38, and therefore the contact portion between the eccentric bearing 38 and the insertion hole 36a changes when the eccentric bearing 38 is rotationally adjusted. In contrast, according to the second embodiment, the protrusions 36d and 36e are formed on the insertion hole 36a, and therefore the contact portion between the eccentric bearing 38 and the insertion hole 36a does not change even when the eccentric bearing 38 is rotationally adjusted. Accordingly, even in the case where the developing roller 33 has an eccentricity itself, a stable contact between the developing roller 33 and the photosensitive drum 13 can be obtained. In other words, the developing roller 33 is allowed to have eccentricity to some extent. As a result, it becomes possible to loosen the dimension tolerance of the developing roller 33, and therefore the manufacturing cost can be further reduced.

According to the above described first and second embodiments, the eccentric bearing is pressed against the insertion hole by the contact portions (i.e., the protrusions) provided on the eccentric bearing or the insertion hole, and therefore the center-to-center distance between the developer bearing body (i.e., the developing roller) and the image bearing body (i.e., the photosensitive drum) does not change even when the developer bearing body and the image bearing body rotate during a printing operation. As a result, a high printing quality can be maintained. Further, a rotational friction can be lowered compared with the case where the outer diameter of the eccentric bearing is larger than the inner diameter of the insertion hole, and therefore the rotational adjustment of the eccentric bearing can be easily performed. Moreover, it is not necessary to maintain the strict dimension tolerances of respective components, and therefore the manufacturing cost can be reduced.

The present invention is applicable to an image forming apparatus used in, for example, a copier, an LED printer, a laser beam printer, a facsimile, an MPF or the like.

While the preferred embodiments of the present invention have been illustrated in detail, it should be apparent that modifications and improvements may be made to the invention without departing from the spirit and scope of the invention as described in the following claims.

What is claimed is:

1. An image forming unit, comprising:
    an image bearing body;
    a rotating body disposed in contact with or disposed facing said image bearing body;
    a supporting member that supports a rotation shaft of said rotating body;
    an insertion hole provided on said supporting member, said insertion hole having a cylindrical inner circumferential surface; and
    a bearing inserted into said insertion hole, said bearing supporting said rotation shaft of said rotating body, said bearing having a center shifted from a center axis of said rotation shaft,
    wherein said bearing and said inner circumferential surface of said insertion hole contact each other at three or more contact portions including at least two protrusions formed on said bearing or said inner circumferential surface of said insertion hole, and
    wherein said at least two protrusions are disposed on an image bearing body side with respect to said center of said bearing.

2. The image forming unit according to claim 1, wherein said contact portions are provided on said bearing.

3. The image forming unit according to claim 1, wherein said contact portions are provided on said insertion hole.

4. The image forming unit according to claim 1, wherein said bearing is an eccentric bearing having a center shifted from a center axis of said rotation shaft.

5. The image forming unit according to claim 1, wherein said protrusions are shaped to have widths decreasing toward tips of said protrusions.

6. The image forming unit according to claim 1, wherein said supporting member is a part of a chassis of said image forming unit.

7. The image forming unit according to claim 1, further comprising a fixing member for fixing a rotational position of said bearing, said fixing member being provided on said supporting member.

8. The image forming unit according to claim 7, wherein said bearing has a gear portion along an outer circumferential surface thereof, and said fixing member engaging said gear portion.

9. The image forming unit according to claim 1, wherein said rotation body is a developer bearing body that bears developer.

10. The image forming unit according to claim 1, wherein an outer diameter of said bearing is smaller than an inner diameter of said insertion hole.

11. An image forming apparatus comprising an image forming unit according to claim 1.

12. The image forming unit according to claim 1, wherein two protrusions are formed on positions defining a center angle of approximately 120 degrees with respect to a center axis of said bearing.

13. The image forming unit according to claim 1, wherein said bearing is made of a material having a Young's Modulus that ranges from 2000 to 4000 MPa and an allowable bending stress that ranges from 50 to 200 MPa.

14. The image forming unit according to claim 2, wherein said supporting member is made of a material that is harder than that of said bearing.

15. The image forming unit according to claim 14, wherein said bearing has an outer diameter, Dh, said insertion hole has an inner diameter, Ds, said protrusions each have a protruding amount, T, and each have an interfering amount, $\Delta T$, with said insertion hole that satisfy: $(Dh+T)-Ds=\Delta T$, and wherein said interfering amount, $\Delta T$, ranges from 100 to 500 μm.

16. The image forming unit according to claim 3, wherein said bearing is made of a material that is harder than that of said supporting member.

17. The image forming unit according to claim 16, wherein said bearing has an outer diameter, Dh, said insertion hole has an inner diameter, Ds, said protrusions each have a protruding amount, S, and each have an interfering amount, $\Delta S$, with said insertion hole that satisfy: $Dh-(Ds-S)=\Delta S$, and wherein said interfering amount, $\Delta S$, ranges from 100 to 500 μm.

18. The image forming unit according to claim 1, wherein said protrusions are formed integrally with said bearing.

19. The image forming unit according to claim 1, wherein said three or more contact portions include an abutting portion where an outer circumferential surface abuts against said cylindrical inner circumferential surface of said insertion hole, and wherein said abutting portion is disposed on a side opposite to said image bearing body with respect to said center of said bearing.

* * * * *